Figure 1:
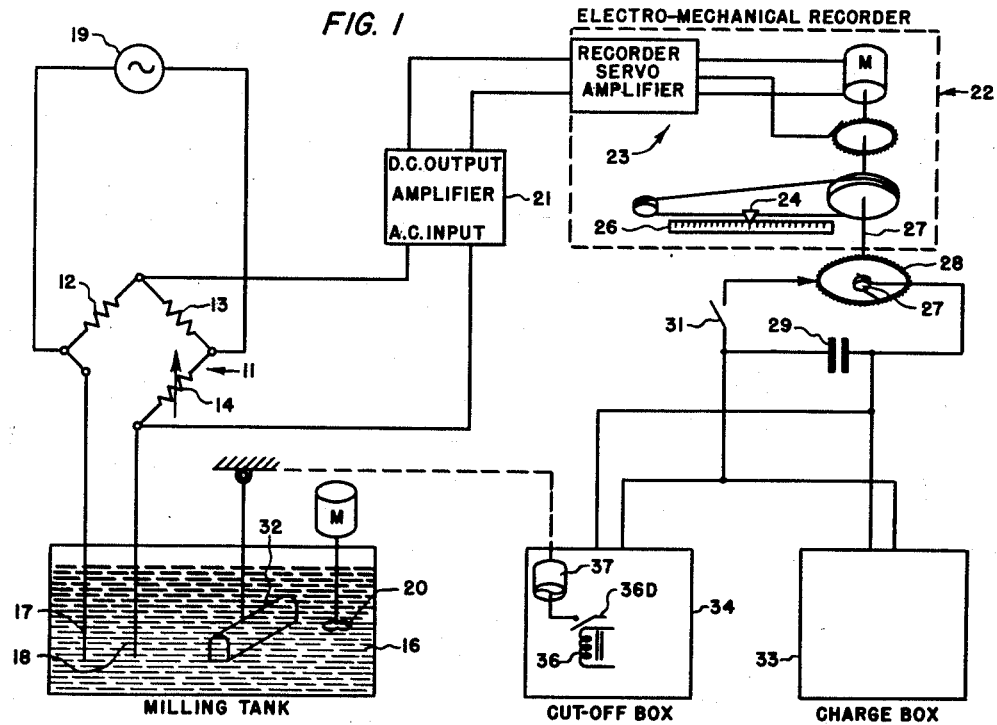

April 19, 1960

E. C. HOELZLE 2,933,675

CHEMICAL MILLING CONTROL

Filed Dec. 28, 1956

3 Sheets-Sheet 1

INVENTOR.
EUGENE C. HOELZLE

BY
Walter J. Jason
ATTORNEY

INVENTOR.
EUGENE C. HOELZLE
BY
*Walter J. Jason*
ATTORNEY

April 19, 1960     E. C. HOELZLE     2,933,675
CHEMICAL MILLING CONTROL

Filed Dec. 28, 1956     3 Sheets-Sheet 3

INVENTOR.
EUGENE C. HOELZLE
BY
*Walter J. Jason*
ATTORNEY

United States Patent Office 2,933,675
Patented Apr. 19, 1960

2,933,675

CHEMICAL MILLING CONTROL

Eugene C. Hoelzle, Pomona, Calif., assignor to General Dynamics Corporation, San Diego, Calif., a corporation of Delaware Application December 28, 1956, Serial No. 631,227

6 Claims. (Cl. 324—30)

This invention relates to chemical process controls and more specifically to a control which integrates the chemical reaction rate with time, wherein the electrical conductivity of the chemical solution is indicative of the rate of chemical reaction.

The principles of this invention can best be explained with application to chemical milling wherein certain areas of a material, such as aluminum, magnesium, titanium or sheet steel, for example, are milled out by chemical etching. This is done by covering areas not to be treated with a vinyl etch-proof film, masking with a copper engraving, photosensitive gelatin or other suitable device. Those remaining areas are exposed to action of a suitable caustic or other chemical agent. A sodium hydroxide solution is a suitable caustic but other chemical attacking means, such as acids, may be used. The etching process is carried out in a tank wherein the material is immersed. The amount and rate of etching is dependent of various factors, such as temperature, time, caustic concentration and type of starting material. After the material has been etched to the desired depth, it is removed, washed, pickled, and surface treated before removal of the protective film.

Heretofore difficulty has been experienced in controlling the depth of the etching. Also, maintaining uniform depth in the mass production of identical parts has presented a problem because of slight variations in composition of the material being milled, the initial concentrations of solution were not uniform due to inaccuracies in mixing and due to weakening of the solution caused by repeated use. Temperature and density variations of the solution caused by the process also affected the rate of cut of the solution. Previously, attempts have been made in stabilizing the rate of cut of the solution and immersing each tank of material the same amount of time in solution. Thus, each tank of material theoretically would be cut to the same depth.

Instead of trying to keep constant the time of operation and the concentration of the milling solution, the apparatus utilizing the principles of the present invention electronically controls the amount of material removed by integrating the milling rate, which is variable and somewhat difficult to accurately control independently, with milling time and reflects this value as a diminishing electrical potential, the value of which is indicative of the volume of material that has been removed at any given time. Additionally, a pre-set sensing device connected to the output potential may be set to actuate when the potential reaches the value indicating the milling operation has been completed, causing the material being milled to be withdrawn from the solution and inserted in a wash bath. By using two baths, one with strong solution and one with weak solution, to make coarse and fine cuts, and using this control, the accuracy of milling should consistently exceed the results obtained by any presently used system.

It is therefore an object of this invention to provide for automatic depth control of chemical etching action on a material and for providing a continuous indication of depth.

Another object is the provision of an automatic depth control which integrates chemical action rate with time for uniformly controlling the depth of chemical action.

Another object is the provision of a depth control for a chemical process wherein the electrical conductivity of the solution is proportional to the rate of chemical action and wherein the conductivity is integrated with time to provide a uniform predetermined depth of chemical action.

Another object is the provision of a method of obtaining a precision milling cut in a material through chemical etching in solutions of various concentrations for durations of time related to the various concentrations of solution.

Another object is the provision of an electronic depth control for chemical milling wherein the conductivity of the milling solution is related to milling rate which in turn is integrated with time to provide etching of predetermined depth.

Still another object is the provision of an electronic depth control for chemical milling to a predetermined depth when there are slight variations in the composition of material being milled and when there are variations in temperature and composition change of solution.

A further object is the provision of an automatic depth control device for use when the chemical solution is repeatedly used even though its concentration is changed.

A still further object is the provision of an automatic depth control for chemical milling wherein the milling rate is non-linear and non-uniform in successive operations due to variations in material, solution concentrations and temperature change during the milling operation.

Still another object is the provision of an automatic depth control whereby a rate of discharge of a condenser is related to the electrical conductivity of the milling solution, which in turn is indicative of milling rate of the solution.

Figure 2:
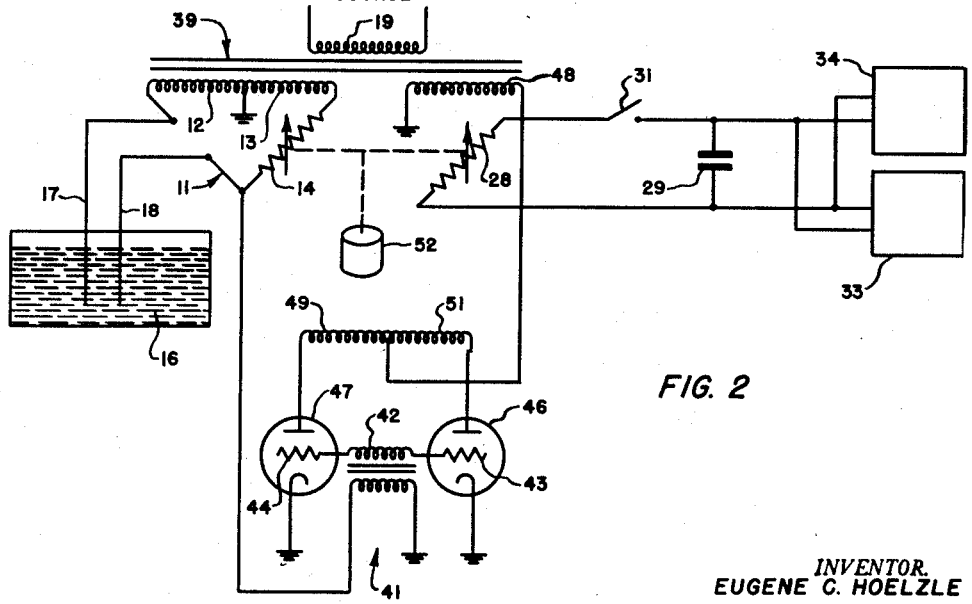
Figure 3:
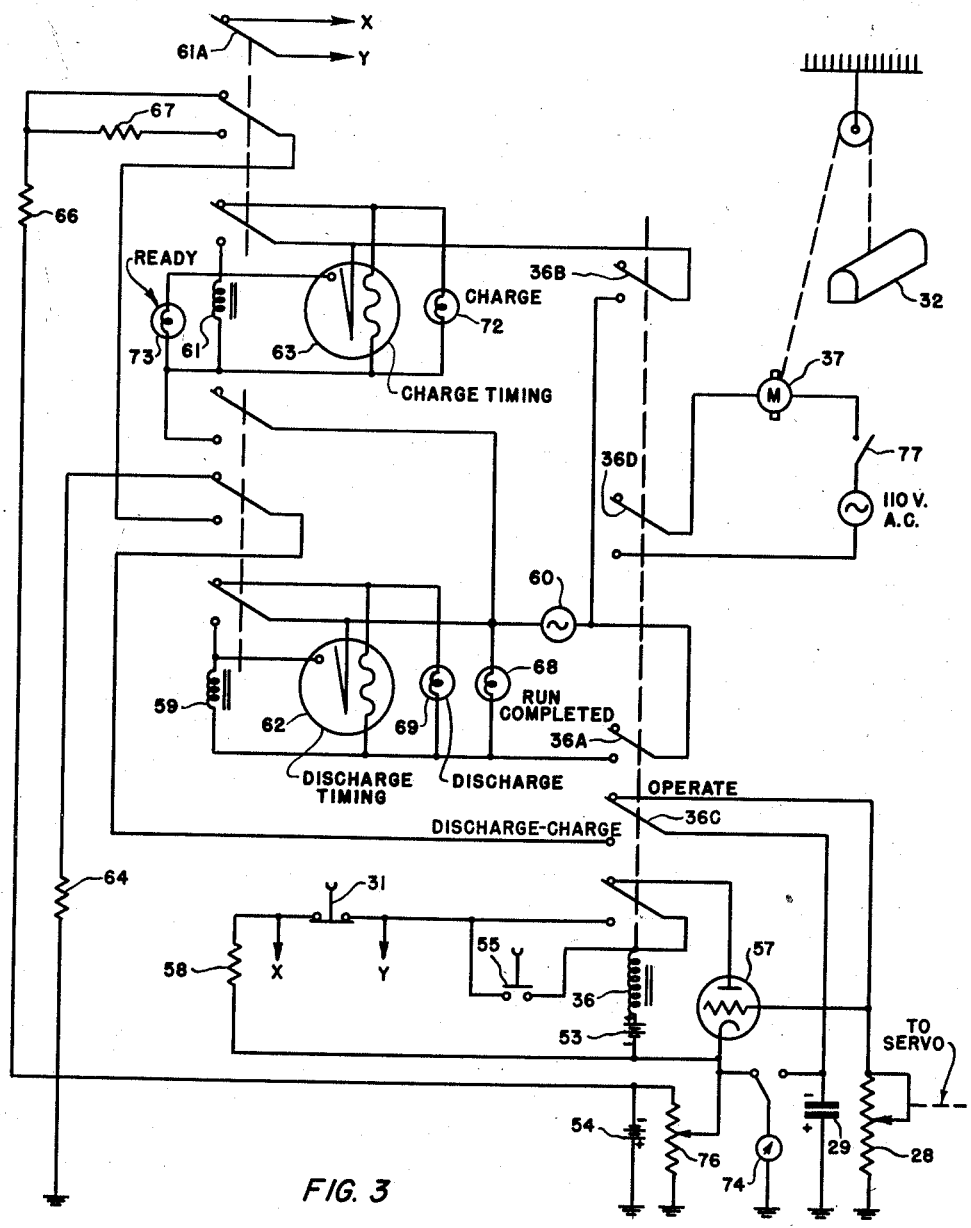
Figure 4:
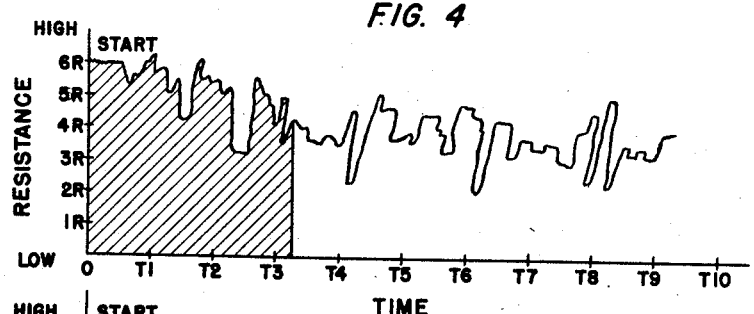
Figure 5:
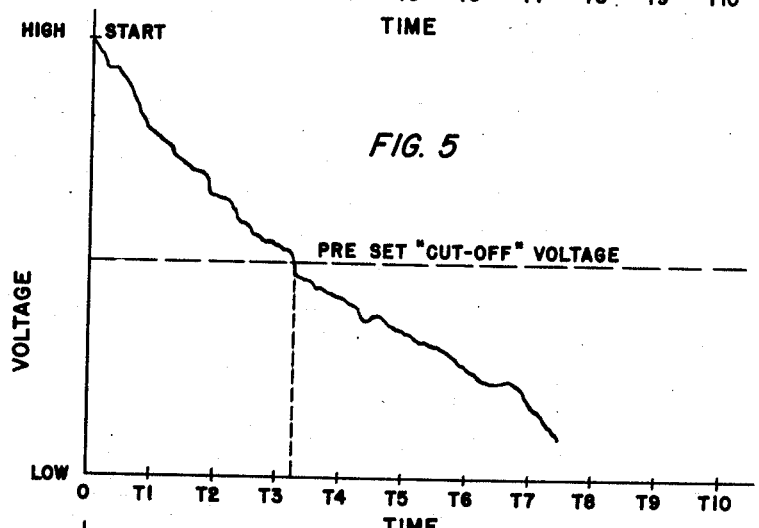
Figure 6:
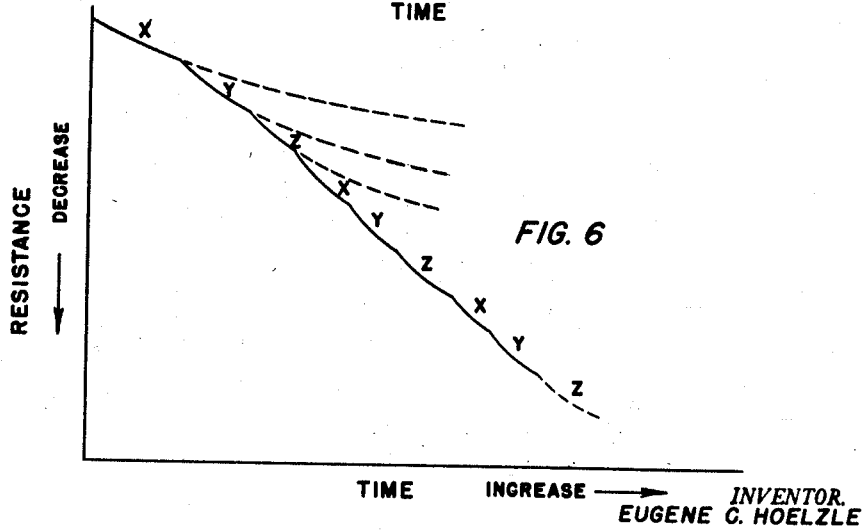

Other objects and features of the present invention will be readily apparent to those skilled in the art from the following specification and appended drawings wherein is illustrated a preferred form of the invention, and in which:

Figure 1 is a schematic of the control circuit;
Figure 2 shows a modification;
Figure 3 is a schematic of the cut-off an charge boxes;
Figure 4 shows a solution resistance versus time curve;
Figure 5 is a diagram showing a typical RC discharge curve of the control; and
Figure 6 is a diagram showing the non-linearity of the conductivity of solution with time due to temperature increase and resultant increase in milling rate.

The electrical conductivity of the solution of a chemical milling bath changes at a rate proportional to changes in temperature and concentration of solution which, in turn, are factors determining milling rate. If the conductivity of the solution is known, i.e., the milling rate of the solution, the time of immersion of the material can be computed or controlled for effecting a predetermined depth of cut in the milling operation. However, as a part is being chemically milled in a tank the milling solution is constantly undergoing temperature and concentration changes, i.e., conductivity changes, which in turn are related to the amount of material that has been milled from the part. This variation of conductivity is continuously monitored during the milling operation by a sensitive A.C. bridge whose initial balance is upset by change in conductivity of the solution. The bridge output controls a servo to which a potentiometer is geared. The potentiometer is part of an RC circuit having a charged capacitor and its setting determines the discharge rate of the capacitor. When the voltage across the capacitor has reached a predetermined value, meaning that the desired depth of cut has been reached, suitable mechanisms are provided for indicating the end of the milling operation and/or automatically removing the part from the solution and inserting it into a wash bath.

Referring now to Figure 1 there is shown an A.C. bridge 11 consisting of fixed resistors 12 and 13, variable resistor 14 and the resistance of the milling solution 16 between the sensing electrodes 17 and 18. The bridge 11 is energized from an A.C. source 19 instead of a D.C. source because an A.C. output is more easily amplified and plating effects on the electrodes 17 and 18 are not present to upset the conduction readings. An agitator 20 keeps the temperature and concentration of the solution uniformly distributed. The A.C. voltage emitted due to the unbalance of bridge 11 is amplified and rectified to provide a D.C. output. This is accomplished by amplifier 21 shown in block form. This amplifier may consist of a conventional A.C. vacuum tube voltmeter with output leads connected to the meter terminal lugs, not shown. Since this is such an obvious expedient to one skilled in the art, further description of the A.C. to D.C. conversion is not thought to be necessary. The amplifier used by the inventor was Model 400C by the Hewlett-Packard Company, although other commercially available amplifiers may be used if desired. The D.C. voltage thus derived is then fed into an electromechanical recorder 22. This recorder is also of conventional design and has a servo motor zero seeking drive 23 for moving an indicator 24 along scale 26. Connected to the drive shaft 27 is an additional variable resistor 28 mounted in such manner that its resistance decreases in value as the recorder indicates a greater voltage unbalance of bridge 11.

Figure 2 shows a modification of the circuit in Figure 1 in that the bridge 11 is rebalanced and in so doing, the potentiometer 28 in the RC circuit is positioned by a phase sensitive servo 52 to determine the suitable rate of discharge of the capacitor. Whereas bridge unbalance in Figure 1 in either direction, by an increase or decrease in conductivity, i.e., milling rate, causes the capacitor to increase its rate of discharge, the phase sensing system in Figure 2 causes the capacitor to increase or decrease its rate of discharge according to change in milling rate. Here the primary winding of transformer 39 is the A.C. source 19. A center tapped and grounded secondary supplies the fixed resistors 12 and 13 while electrodes 17 and 18 (with chemical solution therebetween) and variable resistor 14 comprise the A.C. bridge 11. The output is connected to a phase sensitive servo amplifier 41. Here opposite ends of secondary winding 42 are connected to the grids 43 and 44 of tubes 46 and 47. A reference winding 48 on transformer 39 supplies the plates of the tubes through the right and left turns 49 and 51 of the field windings of servo 52. Whether the resistance across the electrodes 17 and 18 is greater or less than that of resistor 14 determines which grid voltage is in phase with the plate voltage, causing current flow through the tube and its corresponding field winding in the servo. This, in turn, causes the servo 52 to move the arm of resistor 14 to its correct value, rebalancing the bridge 11 to a zero output. The wiper arm of potentiometer 28 in the RC circuit is also mechanically connected to the servo shaft for movement to a position indicative of the conductivity of the solution 16. Potentiometer 28 follows all excursions sensed by the bridge 11 and in turn causes the capacitor 29 to discharge at the correct rate.

A schematic of the cut-off box 34 and charge box 33 is shown in Figure 3. There are two D.C. power supplies shown, 53 and 54. One, 53, is solely for energizing D.C. relay 36 through either the conduction of tube 57 or by depressing the "Emergency Stop" switch 55. The other D.C. power supply 54 performs a dual purpose, that of supplying the reference cut-off voltage as well as being the charging voltage source for capacitor 29. This supply should be quite well voltage regulated. It may be noted that the positive end of the supply 54 is grounded. The purpose of this is to prevent the tube 57 from constituting any kind of a phantom load across capacitor 29 during its control run. The tube 57 should be of a sharp-cut-off variety. The relay current limiting resistor 58 is to prevent damage to the relay 36 should the voltage of the D.C. power supply 53 exceed the relay rating while still being high enough for tube 57 to conduct properly. Relays 59 and 61 are A.C. operated relays 110 volt. The thermal time delay tubes 62 and 63 are one minute delay tubes, in that after one minute of heating, their internal relay contacts closed. These delay tubes are so connected with contacts of relays 59 and 61 that the moment their internal contacts close, the thermal heater is simultaneously cut off. When quickly discharging or charging capacitor 29 extremely high currents will flow for a very short time which could easily cause relay contact damage. Consequently, two one-ohm current limiting resistors 64 and 66 have been added to cushion the surge of current. A 22-megohm resistor 67 is in the circuit to merely balance out the tendency of the capacitor 29 to slowly discharge due to finite leakage. This will keep a consistent charge in capacitor 29 in spite of irregularity in time between consecutive runs.

The system is initially turned on by applying the 110 volt A.C. from source 60 and the power from the two D.C. supplies 53 and 54. Tube 57 should naturally start in a conducting condition as the charge in capacitor 29 should have drained through resistor 28 to a voltage that would make the cathode of tube 57 more negative than its grid, which is tied to capacitor 29 when the system is de-energized. The conduction of tube 57 causes relay 36 to energize. Relay 36 closes contact 36A and the "Run Completed" pilot light 68 and the "Discharge" pilot light 69 will come on. As soon as relay 36 energizes and these lights come on, time delay tube 62 begins to heat. After one minute of heating its internal contacts close, energizing relay 59, which becomes self-holding through its lower set of contacts, cutting the heating current from tube 62. It may be seen that the capacitor 29, that had been discharging any charge that was present on it through the discharge current limiting resistor 64 during this initial minute of operation before relay 59 was energized, now is receiving charging voltage through the charge path current limiting resistor 66. The "Discharge" light 69 goes out, the "Run Completed" light 68 stays on, and the "Charge" light 72 comes on. At this time the second thermal tube 63 is heating as a result of relay 59 closing its heater current path. (Relay 36 previously had closed contact 36B.) After one minute tube 63's internal contacts close causing relay 61 to energize, which in turn cuts off the charging voltage from 29 wtih exception of a retainer voltage being held by the 22-megohm resistor 67. Also tube 63's heater current is now cut off. "Charge" light 72 goes out and "Ready" light 73 comes on. Further, the upper contacts 61A of relay 61 now are open and will permit the momentary push of "Start" switch 31 to again start the controller's action. (When closed, contact 61A prevents the next run from being started until the discharge-charge sequence has been completed.) The bridge 11 should be adjusted for a zero voltage output and then the part 32 placed in the bath 16 at the same time the "Start" button 31 is depressed. At the time "Start" button 31 is depressed, relay 36 is de-energized, the self-holding relays 59 and 61 are released and the "Run Completed" light 68 and "Ready" light 73 go out. Also contact 36C now connects the charged capacitor 29 to the conductivity controlled variable resistance 28 through which it discharges at a controlled rate. Electrostatic meter 74 may be used to ready the voltage across the capacitor 29 as desired.

The grid voltage on tube 57, i.e., voltage across 29, reduces during the milling operation to the point that tube 57 again starts conducting. This value is determined by the manual cut-off voltage setting of resistor 76 in the tube circuit. This setting has previously been made for the depth of cut desired. During the milling operation, manual switch 77 has been closed. Tube 57 again energizes relay 36 which closes contact 36D in the part removal circuit thereby removing the part from the bath. (This contact was also closed earlier, during the discharge-charge sequence, but was not effective because contact 77 was open.) Contacts 36A, 36B and 36C are also actuated and a new discharge-charge sequence begins while the old part 31 is removed and a new part 31 is being readied for the milling operation.

*Theory of operation*

It has been established that as a part is being chemically milled in a tank, the milling solution will undergo certain conductivity changes which are related to the amount of material that has been milled from the part. A typical solution resistance versus time curve during a run is shown in Figure 4. The area under the curve at any given time has a direct relationship to the amount of material that has been removed by the milling. To integrate all the minute points on the curve to establish total area under the curve at any specific time, a capacitor 29 is discharged at a rate governed by a variable resistor 28, whose value is varied in proportion to the continually changing conductivity of the solution. The RC discharge curve of a charged capacitor under such circumstances will reflect a voltage change at a rate governed by a solution conductivity, hence when the voltage across the capacitor 29 reaches a predetermined cut-off value, it is a true representation of the area under the curve previously described, which in turn is directly related to the amount of material milled from the part. A typical RC discharge curve is shown in Figure 5.

As previously mentioned, the conductivity of a chemical milling solution changes at a rate that is proportional to the milling rate. These conductivity changes may be brought about by changing the temperature of the solution, composition changes of the solution, or a combination of both. The action of the chemicals in solution as the piece is being milled will bring about both temperature and composition change. Consequently, the solution best suited for use with this control is one having a conductivity change due to temperature rise to be in the same direction as the conductivity change due to composition change during the chemical reaction in milling. However, in solutions in which temperature rise changes the conductivity in a direction opposite to the conductivity change with composition change, two sensing elements may be used and polarized so as to give a maximum additive signal. This cascading effect of change in composition and temperature change is shown in Figure 6. Here curve X represents the conductivity change due to composition change without change in temperature. From this curve, curve Y is added. Curve Y is the change in curve X due to temperature increase of the solution during the operation. An additional characteristic of the milling operation is that the milling rate increases as the solution temperature rises. Curve Z is the change in curve Y due to the increase in milling rate resulting from the temperature rise. Curve Z is then a new conductivity curve which must be changed to new X curve (solution composition change). The new X curve changes to a new Y curve due to new temperature change. The new Y curve is again changed to a new Z curve due to the resultant increase in milling rate. This cascade effect continues throughout the milling operation. Thus it becomes obvious that a relatively small tank of milling solution should be used to obtain the best magnitudes of conductivity change for best operation of the chemical milling control comprising this invention.

While certain preferred embodiments of the invention have been specifically disclosed, it is understood that the invention is not limited thereto as many variations and additional uses will be readily apparent to those skilled in the art and the invention is to be given its broadest possible interpretation within the terms of the following claims.

What I claim is:

1. Means for controlling the rate of discharge of a charged capacitor in accordance with the milling rate of a chemical bath solution on a workpiece comprising an electrical energy storage device, a discharge path for discharging said device, said discharge path including a variable impedance, and means responsive to the electrical conductivity of said solution for varying said impedance.

2. Means for controlling the depth of chemical milling on a workpiece comprising a capacitor, means for charging said capacitor to a predetermined value, means for discharging said capacitor at a rate indicative of the milling rate of a chemical bath on said workpiece, said discharging means comprising a variable resistance connected across said capacitor and providing a discharge path therefor, means for varying said resistance with change in electrical conductivity of said bath, and means for indicating a predetermined minimum charge on said capacitor.

3. Means for controlling the depth of chemical milling on a workpiece comprising a capacitor, means for charging said capacitor, means for discharging said capacitor at a rate indicative of the milling rate of a chemical bath on said workpiece, said discharging means comprising a variable resistance connected across said capacitor and providing a discharge path therefor, and means for varying said resistance with change in electrical conductivity of said bath.

4. Circuit means and switch control means for discharging, charging and controlling the rate of discharge of a capacitor and for actuating external circuitry when said capacitor has discharged to a predetermined amount, said circuit and switch control means comprising a discharge ground path connected to said capacitor and having two circuit breaking switches therein, a second ground path having a variable resistance therein, one of said switches normally disconnecting said discharge ground path from said capacitor and connecting said second ground path thereto, a capacitor charging source, the other of said switches in said discharge ground path when actuated being operable to connect said charging source to said capacitor, and relay means for actuating said switches upon energization thereof, said variable resistor being operable to control the discharge rate of said capacitor when connected thereto.

5. Means for controlling the depth of chemical milling on a workpiece in a chemical bath comprising a capacitor, circuit means and switch control means for discharging, charging and controlling the rate of discharge of said capacitor and for actuating external circuitry when said capacitor has discharged to a predetermined amount, said circuit and switch control means comprising a discharge ground path connected to said capacitor and having two circuit breaking switches therein, a second ground path having a variable resistance therein, one of said switches normally disconnecting said discharge ground path from said capacitor and connecting said second ground path thereto, a capacitor charging source, the other of said switches in said discharge ground path when actuated being operable to connect said charging source to said capacitor, relay means for actuating said switches upon energization thereof, and means for varying the value of said variable resistor with change in electrical conductivity of said bath to thereby control the discharge rate of said capacitor when said resistor is connected thereto.

6. Means for controlling the depth of chemical milling on a workpiece comprising a capacitor, means for charging said capacitor, means for discharging said capacitor at a rate indicative of the milling rate of a chemical bath on said workpiece, said discharging means comprising a variable resistance connected across said capacitor and providing a discharge path therefor, means for varying said resistance with change in electrical conductivity of said bath comprising a bridge, one leg of said bridge including the conductivity of said solution in circuit, said bridge having a voltage output proportional to change in said conductivity, and electrical means connected to said bridge for varying said resistance proportional to said voltage output.

References Cited in the file of this patent
UNITED STATES PATENTS

| | | |
|---|---|---|
| 1,819,868 | Carter | Aug. 18, 1931 |
| 2,443,398 | Neff | June 15, 1948 |
| 2,575,712 | Jernstedt | Nov. 20, 1951 |
| 2,621,808 | Blakeney | Dec. 16, 1952 |
| 2,685,052 | Boyer | July 27, 1954 |
| 2,697,191 | Wannamaker | Dec. 14, 1954 |
| 2,724,918 | Triman | Nov. 29, 1955 |
| 2,769,139 | Obenshain | Oct. 30, 1956 |
| 2,784,154 | Korbelak | Mar. 5, 1957 |
| 2,788,473 | Breckman | Apr. 9, 1957 |